United States Patent [19]

Green

[11] Patent Number: 5,062,234

[45] Date of Patent: Nov. 5, 1991

[54] PORTABLE BLIND

[76] Inventor: Richard T. Green, 1023 N. 15th St., Arkadelphia, Ark. 71923

[21] Appl. No.: 383,726

[22] Filed: Jul. 24, 1989

[51] Int. Cl.$^5$ ............................................ A01M 31/02
[52] U.S. Cl. ............................................ 43/1; 135/901
[58] Field of Search .................. 43/1; 135/901, 106, 135/107, 108, 109, DIG. 9

[56] References Cited

U.S. PATENT DOCUMENTS

| | | | |
|---|---|---|---|
| 2,159,273 | 5/1939 | Killinger | 43/1 |
| 2,771,088 | 11/1956 | Soldan | 135/DIG. 9 |
| 2,935,074 | 5/1960 | Baker | 135/107 |
| 3,690,334 | 9/1972 | Miller | 43/1 |
| 3,709,237 | 1/1973 | Smith | 135/901 |
| 3,913,598 | 10/1975 | Glutting, Jr. | 43/1 |
| 4,364,193 | 12/1982 | Visco | 43/1 |
| 4,473,087 | 9/1984 | Cavender | 135/901 |
| 4,685,484 | 8/1987 | Moneta | 135/DIG. 9 |
| 4,766,918 | 8/1988 | Odekirk | 135/106 |
| 4,773,437 | 9/1988 | Glutting | 135/901 |

*Primary Examiner*—Kurt Rowan
*Attorney, Agent, or Firm*—John M. Harrison

[57] ABSTRACT

A portable blind which is characterized in a preferred embodiment by a length of camouflage material provided with a desired camouflage pattern, which material is stretched between multiple supports embedded in the ground, to define discreet panels and conceal a hunter or observer. The camouflage material can be fitted with a drawstring around the top edge thereof and is characterized by cloth or netting. Different camouflage patterns may be provided on the front and back of the camouflage material, in order to facilitate reversing the camouflage panels to accord with the hunting or observation terrain. In a most preferred embodiment, the elongated supports include a bottom member, a receptacle fitted to the top end of the bottom member for receiving the bottom end of a corresponding top member and an elastic band connecting the bottom end of the top member to the top end of the bottom member. Alternatively, the bottom member may be telescoped into the top member to disassemble the blind, and extended from the bottom member to deploy the blind. Accordingly, the portable blind may be disassembled, with the top member disengaged from the bottom member or the bottom member telescoped inside the top member and the camouflage material rolled on the top and bottom members and secured in this configuration and to the belt of the hunter or observer, by means of loop-pile fasteners.

2 Claims, 1 Drawing Sheet

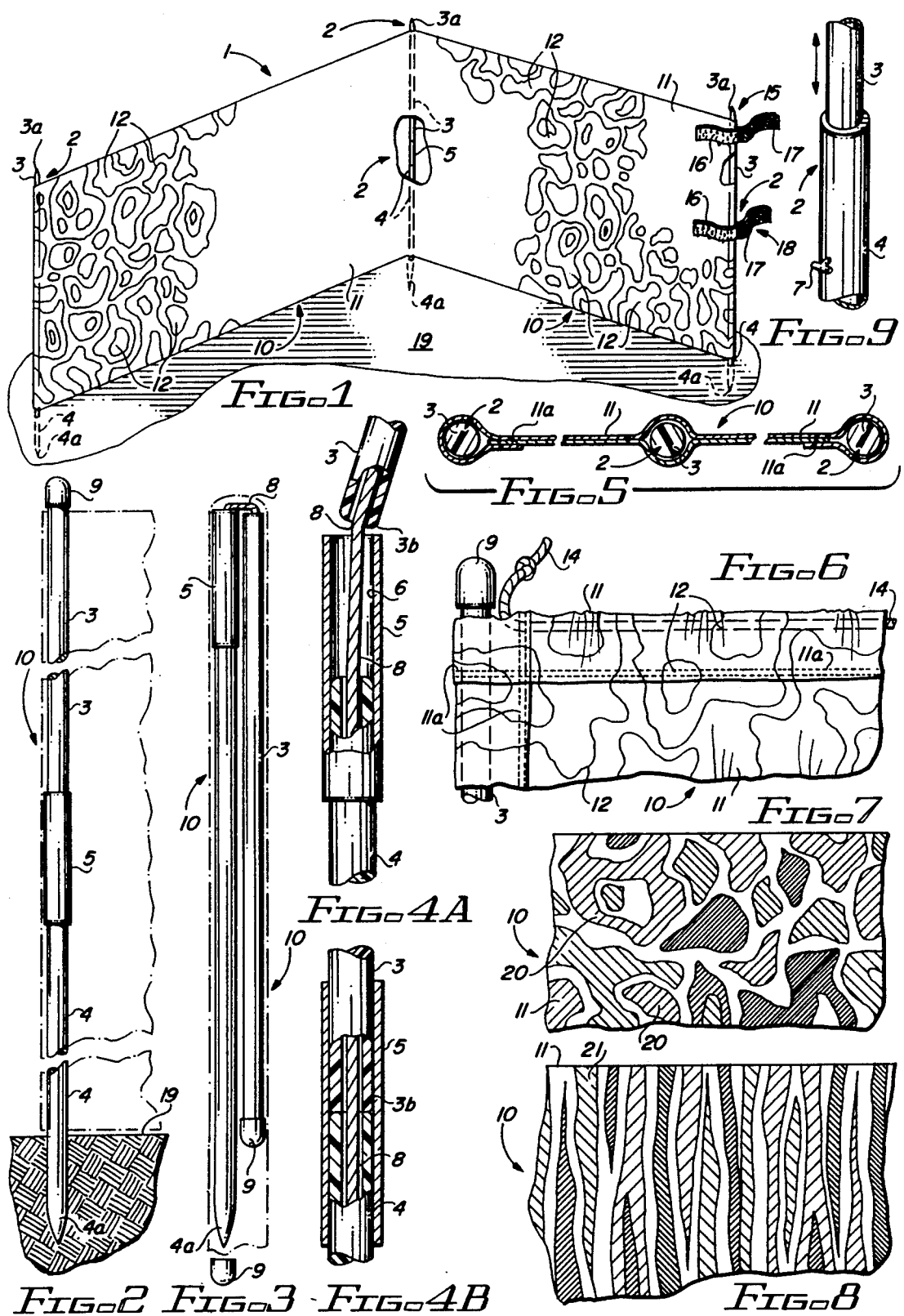

PORTABLE BLIND

BACKGROUND OF THE INVENTION

Field of the Invention

This invention relates to outdoor activities such as hunting, bird watching, wildlife observation and the like and more particularly, to a portable blind for concealing an observer, such as a hunter, which blind is characterized in a first preferred embodiment by a flexible camouflage material of selected length and width, supported by elongated supports connected by an elastic or rubber band, wherein the base of the top member is fitted into a receptacle located in the bottom member. Alternatively, in a second preferred embodiment, the supports are telescoped one inside the other, in order to facilitate extension and support of the camouflage material when the blind is in functional configuration and wrapping the camouflage material on the retracted telescoped supports to enhance portability for carrying the blind.

Furthermore, one or more drawstrings may be provided along the top and/or the bottom edges of the camouflage material to aid in shaping the portable blind into a more naturally-appearing configuration and better conceal an observer. Moreover, a pair of spaced loop-pile fasteners may be secured to one end of the camouflage material to facilitate maintaining the portable blind in a tight roll and secure the portable blind to the belt backpack or other accessory of the observer.

One of the problems which is inherent in hunting and wildlife observation and particularly, in hunting and observing such wary game as deer, turkey and the like, is that of adequately concealing the hunter or observer from approaching game. Typical stands and blinds include platforms mounted in trees, triangular-shaped portable stands having a rotating, saddle-type seat at the top and large, cumbersome, portable stands constructed of plywood or cardboard, which are difficult to transport, deploy and use effectively. Since wild game typically have very sharp eyesight and are sensitive to even small movements, the use of camouflage clothing is sometimes insufficient to allow close approach by game. A close approach to the hunter is particularly necessary during bow and arrow hunting, and in the case of wildlife observation and photography, additional cover, whether natural or artificial, is usually necessary to facilitate close approach by wild animals and birds.

Description of the Prior Art

Typical of the prior art concealment devices known in the prior art is the "Hunter Blind" detailed in U.S. Pat. No. 3,052,054, dated Sept. 4, 1962, to W. S. Littleton, et al. The blind includes a series of connected, inflatable units shaped to resemble animate or inanimate objects. The inflatable units are light in weight to facilitate easy transportation and are easily inflated at the hunting site and deflated after use, either by mouth, by use of a small pump or by using a compressed air cartridge. U.S. Pat. No. 3,622,201, dated Nov. 23, 1971, to T. N. Radig, details a "Portable Blind" for providing concealment and shelter in the field for hunters or observers of wildlife. The blind is constructed of separable and foldable parts, both to permit quick and convenient assembly under field conditions and to facilitate convenient transportation and storage. The blind includes a seat, and the seat and cover portions of the blind are adapted for rotation as a unit upon the support structure to allow quiet and unobtrusive scanning of the surrounding terrain in an direction without the user emerging from the blind. The cover portion of the blind, which may be camouflaged, is adapted for immediate and automatic opening from a normal, closed condition to an open condition, to provide a wide angle field for vision or shooting. Another "Hunter's Blind" is detailed in U.S. Pat. No. 3,642,318, dated Feb. 15, 1972, to Ralph L. Avant. The device includes a collapsible structure having hinged elements that are coated with a suitable covering and including an adjustable seat member. U.S. Pat. No. 3,913,598, dated Oct. 21, 1975, to Roy H. Glutting, Jr., details a "Hunter's Blind and Shelter". The portable hunter's blind and shelter includes a fabric wall extended over and attached to a portable wall frame structure, the members of which are pivotally and removably attached to each other, so that the size and shape of the hunter's blind may be varied to suit the needs of the hunter and the terrain. Furthermore, the blind may include a removable ceiling for shelter from rain and the like and the shelter also includes shooting openings in the fabric wall, which openings may be concealed by flaps. U.S. Pat. No. 4,364,193, dated Dec. 21, 1982, to John Visco, details a "Portable Blind" of two-piece construction, which is easily and readily assembled on location. The blind includes an umbrella portion and a skirt portion, which upon assembly, are fixedly secured together so as to form a unitary, camouflaged enclosure. U.S. Pat. No. 4,777,755, dated Oct. 18, 1988, to James A. Colburn, details a "Portable Hunting Blind and Shelter". The hunting blind includes an upper frame characterized by a peripheral frame structure, top reinforcing side members and a cross-strut. Gun support bars are attached to and vertically spaced from the upper frame and a bottom frame structure is separably attached to the upper frame. A cover extends about the upper frame and the lower frame and includes multiple window openings and a flap on the inside, as well as a flap on the outside of the window openings to open or close the openings at the discretion of the hunter occupying the blind. U.S. Pat. No. 4,817,579, dated Apr. 4, 1989, to Ralph R. Mathias, details a "Camouflage Shield for Archers". The camouflage device is designed to disguise and conceal an archer and a hunting bow and includes a light-weight frame which supports a camouflage netting. The frame is adjustably and removably attached to a hunting bow and preferably includes a section of camouflage netting which is adapted to permit the archer to see therethrough, together with an opening through which an arrow may be shot.

It is an object of this invention to provide a portable, light-weight blind which may be carried on the belt, in a backpack or in similar manner by a hunter or observer when packaged in non-functional configuration, and deployed in functional configuration to adequately conceal the hunter or observer, without alerting wildlife.

Another object of this invention to provide a portable blind which is characterized by a sheet of camouflage material of selected length, width and camouflage pattern, multiple elongated supports adapted for insertion in the ground and supporting the camouflage material in a desired configuration to conceal one or more hunters or observers and an adjusting mechanism provided in the supports to permit folding or telescoping of the supports, rolling or accumulating the camouflage material on the respective support members and carrying the portable blind to and from the hunting or observation area.

Yet another object of the invention is to provide a portable blind for concealing a hunter or observer, which blind includes at least two elongated, collapsible or telescoping support members attached in spaced relationship to a sheet of flexible camouflage material having a drawstring along either or both of the top and bottom edges thereof, such that the portable blind may be deployed in functional configuration to conceal a hunter or observer, and rolled or folded for convenient transportation.

Another object of this invention is to provide a portable blind which is characterized by multiple, elongated support members, the bottom segments of which are each fitted with a receptacle and the ends of which segments are connected by a rubber band or elastic member to facilitate selective attachment and folding thereof, which support members are adapted to support a length of camouflage netting or material to conceal a hunter or observer in functional configuration and to fold and facilitate rolling or folding of the camouflage material on the folded support members to conveniently carry the portable blind.

Still another object of the invention is to provide a portable blind which is characterized by multiple, elongated, telescoping supports adapted for extension and insertion in the ground to support a length of camouflage cloth or netting in a desired configuration and conceal a hunter or observer, and retraction to facilitate accumulation of the camouflage material on the supports and easy carrying of the portable blind.

SUMMARY OF THE INVENTION

These and other objects of the invention are provided in a new and improved portable blind which is characterized in a first preferred embodiment by multiple, elongated supports, each defined by support members connected at the ends by means of a receptacle and an elastic band to facilitate extension and insertion in the ground for supporting a length of camouflage netting or cloth in spaced relationship and concealing a hunter or observer of wildlife, and folding or otherwise accumulating the camouflage cloth thereon for carrying the portable blind. In a second preferred embodiment, the supports are extended in telescoping fashion for insertion in the ground to support the camouflage netting o cloth in functional configuration and retracted to receive the camouflage cloth in rolled or folded mode, for portability. The camouflage cloth or netting may be characterized by various camouflage configurations on either or both sides thereof, to facilitate reversability of the portable blind, a drawstring may be provided along the top edge of the camouflage netting or cloth and one or more loop-pile fasteners may be attached to the camouflage cloth or netting for securing the portable blind in transportation configuration and attaching the portable blind to the belt, backpack or other accessory of the hunter or observer, in carrying configuration.

BRIEF DESCRIPTION OF THE DRAWING

The invention will be better understood by reference to the accompanying drawing, wherein:

FIG. 1 is a perspective view of the portable blind of this invention in functional, deployed configuration for concealing a hunter or observer;

FIG. 2 is a side view of a first preferred elongated support, the support segments or members of which are connected by an elastic band;

FIG. 3 is a side view of the disassembled segments of the elongated support illustrated in FIG. 2 for deployment of the portable blind in carrying configuration;

FIG. 4A is a longitudinal sectional view of a portion of the elongated support illustrated in FIG. 2, in partially disassembled configuration;

FIG. 4B is a longitudinal sectional view of a portion of the elongated support illustrated in FIG. 2 in assembled configuration;

FIG. 5 is a transverse sectional view of the portable blind illustrated in FIG. 1;

FIG. 6 is a side view, partially in section, of a segment of camouflage material provided with a drawstring, which camouflage material is connected to one of the elongated supports in the portable blind illustrated in FIG. 1;

FIG. 7 is a side view of a section of camouflage material illustrating a preferred camouflage pattern;

FIG. 8 is a side view of a section of camouflage material illustrating an alternative preferred camouflage pattern; and FIG. 9 is a side view, partially in section, of a telescoping elongated support.

DESCRIPTION OF THE PREFERRED EMBODIMENTS

Referring initially to FIG. 1 of the drawing, in a preferred embodiment the portable blind of this invention is illustrated by reference numeral 1 and includes three elongated supports 2, each of which is characterized by a top segment or member 3 and a bottom segment or member 4. The top member 3 is further characterized by a sharpened top member tip 3a, while the bottom member 4 includes a sharpened bottom member tip 4a, which is inserted in the ground 19, as illustrated. A length of camouflage material or netting 10 is supported by the supports 2 to define two generally rectangular-shaped panels 11 and the loop tab 16 and pile tab 17 of a loop-pile fastener 15 are sewn or otherwise secured to one edge of the right-hand panel 11 of the camouflage material 10 near the top edge of the right-hand panel 11. Furthermore, a blind loop-pile fastener 18 is sewn to the same edge of the right-hand panel 11 in spaced relationship with respect to the belt loop-pile fastener 15, and also includes a loop tab 16 and a companion pile tab 17, for securing the portable blind 1 to a belt loop or other area of a hunter or observer's clothing, (not illustrated). As further illustrated in FIGS. 1-4B, a receptacle 5 is provided on the top end of each bottom member 4 and includes a receptacle bore 6, for receiving the top member base 3b of the top member 3, in order to facilitate deploying the supports 2 for use as a blind a illustrated in FIG. 1. Accordingly, when the supports 2 are extended in spaced relationship and thrust into the ground as illustrated in FIGS. 1 and 2, the camouflage material 10 connected thereto is stretched to define the panels 11, and the woodland camouflage pattern 12 is visible on the outside thereof. As further illustrated in FIG. 1, it will be appreciated that the supports 2 can be arranged in a selected pattern or relationship in order to secure the panels 11 such that one or more hunters or observers are completely hidden behind the portable blind 1, in order to avoid alerting wildlife in the area. When it is desired to remove the portable blind 1 and leave the hunting or observation area, the supports 2 are removed from the ground, the top member 3 is extended from the receptacle 5 in the bottom member 4 against the bias of the elastic band 8 as illustrated in FIG. 4A and the top member 3 and bottom member 4 placed adjacent to each other in side-by-side relationship, as illustrated in FIG. 3. The camouflage material 10 is then rolled, folded or otherwise accumulated on the folded supports 2 to define a small package which can be secured by connecting the loop tab 16 and pile tab 17 of the blind loop-pile fastener 18 and carried by the hunter or observer in a backpack or by means of the belt loop file fastener 15, wherein the loop tab 16 is attached to the pile tab 17, to secure the portable blind 1 to a belt (not illustrated).

Referring again to FIGS. 1-6 of the drawing, a cap 9 may be fitted over the top member tip 3a, as well as the bottom member tip 4a, of each of the top members 3 and bottom members 4, in order to prevent injury from handling the portable blind 1. Furthermore, as illustrated in FIGS. 5 and 6, a drawstring 14 may be provided in a casing created by lapping the top edge of the camouflage material 10 and securing the lapped edge by means of a panel seam 11a, as illustrated in FIG. 6. This design permits closing of the top edge of the panels 11 around the hunter or observer as the supports 2 lean toward the hunter or observer responsive to tightening of the drawstring 14. Another drawstring (not illustrated) can be added to the bottom edge of the camouflage material 10, as desired. Moreover, this construction facilitates sewing sleeves into the camouflage material 10 to receive the respective supports 2, wherein the sleeves can be "gathered" on the bottom member 4 as the supports 2 are telescoped, in order to better facilitate rolling the camouflage material 10 on the supports 2.

Referring now to FIG. 9 of the drawing, in an alternative preferred embodiment of the invention the supports 2 can be telescoping in design, wherein the top member 3 telescopes into the bottom member 4, in order to facilitate wrapping the camouflage material 10 around the supports 2 and prepare the portable blind 1 for transportation. Accordingly, the supports 2 are deployed by telescopically extending the top member 3 from the bottom member 4, tightening the thumb screw 7, which is threaded in the bottom member 4, against the top member 3 to maintain this extension in the supports 2 and deploying the portable blind 1 as described above and as illustrated in FIG. 1. When the portable blind 1 is to be removed from the hunting or observation area, the thumb screw 7 in each of the supports 2 is then loosened, the top member 3 telescopically retracted into the bottom member 4 and the thumbscrew 7 again tightened to maintain the supports 2 in retracted configuration. The camouflage material 10 is then rolled or otherwise accumulated on the telescoped supports 2, the blind loop-pile fastener 18 used to secure the portable blind 1 in carrying configuration and the belt loop pile fastener 15 may then be used to secure the portable blind 1 to the belt or backpack of the hunter or observer.

It will be appreciated by those skilled in the art that the camouflage material 10 can be characterized by cloth or netting and in addition to the woodland camouflage pattern 12 illustrated in FIG. 1, may also include such other well known patterns as the leaf foliage camouflage pattern 20, illustrated in FIG. 7, the tall grass camouflage pattern 21, illustrated in FIG. 8 and other patterns, such as the "Realtree", "Trebark" and "Woodland" patterns (not illustrated) which are also well known to those skilled in the art.

It will be further appreciated by those skilled in the art that the length and height of the camouflage material 10 can be varied to suit the stature of the hunter or observer and the number of supports 2 can be chosen to define a selected number of panels 11 of desired size in the portable blind 1. These choices are dictated by the degree of concealment necessary, the number of hunters or observers to be located in the portable blind 1 and other factors, including the type of wildlife which is being hunted or observed. Furthermore, as described above, the sharpened top member tips 3a and bottom member tips 4a of both the foldable and telescoping supports 2, facilitate insertion of either end of the supports 2 in the ground 19, to display either side of the panels 11 toward the game or wildlife from which concealment is desired. Moreover, the respective sides of the panels 11 may be imprinted with separate ones of the various camouflage patterns illustrated in FIGS. 1, 7 and 8 of the drawing, as well as the popular "Realtree", "Trebark" and "Woodland" patterns which are known and widely used by hunters and wildlife observers. Since the sides of the panels 11 must be reversed from top to bottom when the supports 2 are reversed for mounting in the ground 19, it follows that the respective camouflage patterns chosen for imprinting on the panels 11 may also need to be reversed, depending upon the designs chosen.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A portable blind for concealing an observer, comprising at least two elongated supports for insertion in the ground in spaced, upward-standing relationship, said supports each characterized by a bottom member having one end sharpened and a receptacle provided on the opposite end of said bottom member, a top member having one end adapted for insertion in said receptacle and the opposite end of said top member sharpened and an elastic band connecting said one end of said top member and said opposite end of said bottom member for biasing said top member in said receptacle; a flexible sheet of camouflage material carried by said supports, a first camouflage pattern provided on one side of said camouflage material and a second camouflage pattern provided on the opposite side of said camouflage material to facilitate insertion of said bottom member in the ground for orienting said camouflage material in a first camouflage orientation and orienting said first camouflage pattern outwardly of the observer and said top member in the ground for orienting said camouflage material in a second camouflage orientation and orienting said second camouflage pattern outwardly of the observer; loop and pile fasteners provided on said camouflage material; and at least one drawstring provided in one edge of said camouflage material, whereby said supports are foldable in said camouflage material and said camouflage material is secured by said loop and pile fasteners to bind said camouflage material and said supports in carrying configuration.

2. A portable blind for concealing an observer, comprising at least two elongated supports for insertion in the ground in spaced, upward-standing relationship, said supports each characterized by an outside member having a sharp free end for selective insertion in the ground, an inside member slidably disposed in the opposite end of said outside member in telescoping relationship and having a sharpened extending end for selective insertion in the ground; retainer means provided in said outside member for selectively engaging said inside member and locking said inside member in extended functional configuration; a flexible sheet of camouflage material carried by said supports, a first camouflage pattern provided on one side of said camouflage material and a second camouflage pattern provided on the opposite side of said camouflage material; loop and pile fasteners provided on said camouflage material; and at least one drawstring provided on one edge of said camouflage material, whereby said supports are deployed in spaced relationship to facilitate insertion of said outside member in the ground in a first camouflage orientation and orienting said first camouflage pattern outwardly of the observer and said inside member in the ground in a second camouflage orientation and orienting said second camouflage pattern outwardly of the observer and selectively deploying said portable blind in said functional configuration and in retracted, carrying configuration bound by said loop and pile fasteners.

* * * * *